Patented Apr. 21, 1936

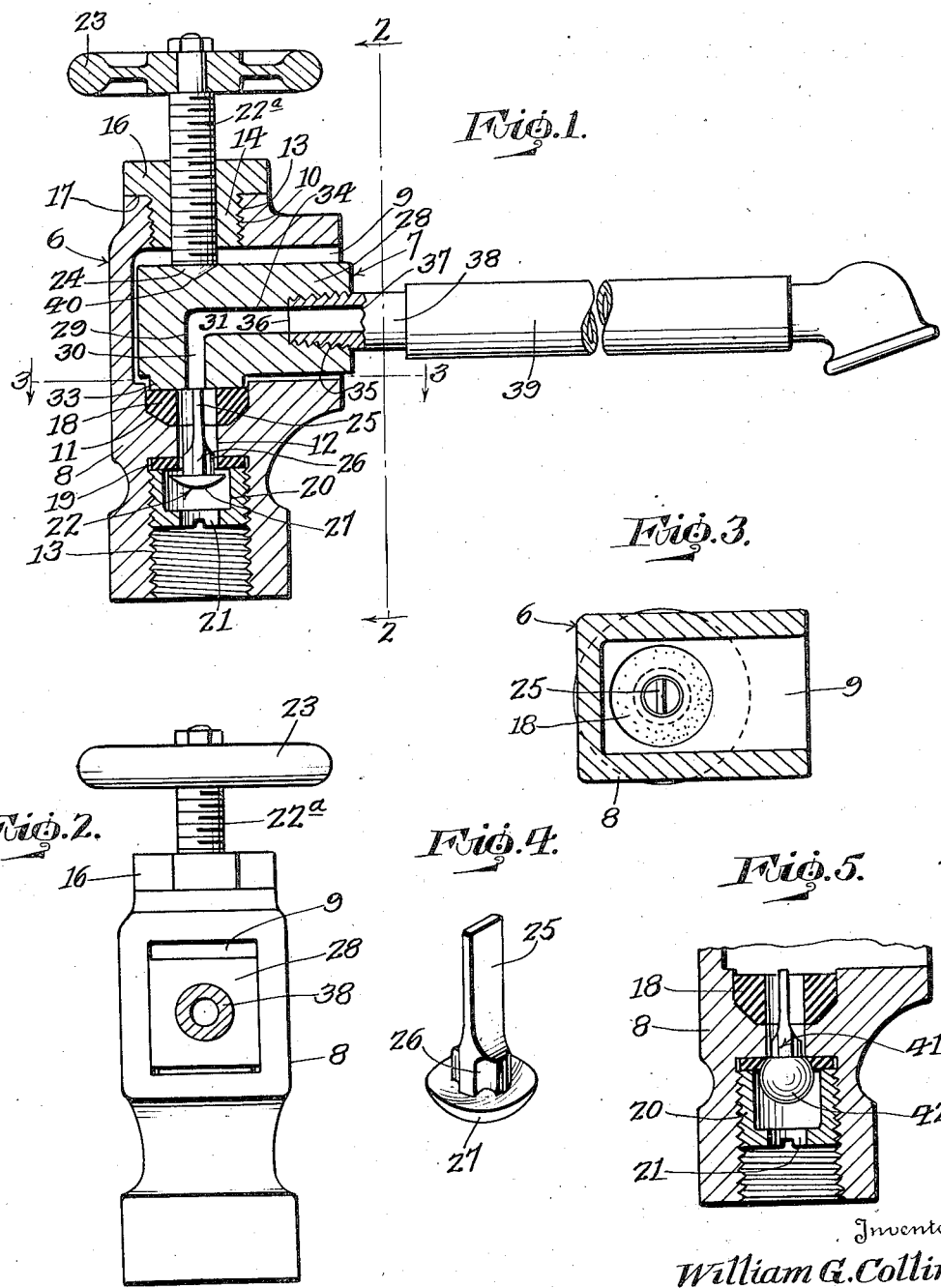

2,038,477

UNITED STATES PATENT OFFICE 2,038,477

HOSE COUPLING CONNECTION

William G. Collins, Wichita Falls, Tex.

Application May 20, 1935, Serial No. 22,465

4 Claims. (Cl. 284—17)

This invention relates to a hose coupling connection designed primarily for use on air supply hose employed at gasoline filling stations, but it is to be understood that the invention may be used in any instance or capacity for which it may be found applicable, as for example, for use in connection with nitrogen and oxygen containers.

The invention has for its object to provide, in a manner as hereinafter set forth, a hose coupling connection providing for a quick change connection when desired.

A further object of the invention is to provide, in a manner as hereinafter set forth, a hose coupling connection that will afford an easier and quicker method for filling station attendants to remove an air hose in the event that it is desired to take the hose in at night.

A further object of the invention is to provide, in a manner as hereinafter set forth, a hose coupling connection for enabling a quick-change connection for nitrogen and oxygen containers.

A further object of the invention is to provide, in a manner as hereinafter set forth, a hose coupling connection including a pair of interengaging elements so constructed that when interengaged an air-passage-way is opened allowing full force of air line to make connection with a detachable line, and when disengaged one of said elements will check the supply of air from its source.

Further objects of the invention are to provide, in a manner as hereinafter set forth, a hose coupling connection which is simple in its construction and arrangement, strong, durable, compact, conveniently disposed for conducting purposes, thoroughly efficient in its use, and inexpensive to manufacture.

With the foregoing and other objects which may hereinafter appear, the invention consists of such parts and such combination of parts as will be specifically described and illustrated in the accompanying drawing, wherein is shown embodiments of the invention, but it is to be understood that changes, variations and modifications may be resorted to which fall within the scope of the invention as claimed.

In the drawing:

Figure 1 is a vertical sectional view of the connection as applied to a hose,

Figure 2 is a section on line 2—2, Figure 1,

Figure 3 is a section on line 3—3, Figure 1,

Figure 4 is a perspective view of the plunger, and

Figure 5 is a fragmentary view in vertical section of a modified form.

Referring to Figures 1 to 4 of the drawing, the connection includes a plunger carrying air feeding female element 6 and an air supply male element 7 for interengagement with the element 6. The latter respectively includes a casting 8 formed with a forward horizontally disposed squared socket 9 opening at the front side thereof; a threaded opening 10 extending from the outer end thereof to the socket 9 in proximity to the base of the latter; an internal cavity 11 intermediate the ends thereof and which opens into socket 9 in proximity to the base of the latter; an air feed port 12 disposed axially thereof and opening at its discharge end into cavity 11 centrally of the base of the latter; and a rear annular socket 13 open at the rear end thereof and communicating through its base with the intake end of the port 12. The sockets 9 and 13 are disposed at right angles to each other. The wall of socket 13 is threaded. The element 6 also includes an internally threaded flange collar 14 having peripheral threads 15 for engagement with the wall of opening 10 and with its flange 16 seated upon the outer end 17 of casting 8; a rubber washer or annulus 18, of the bib type, seated upon the base of and of less height than the depth of cavity 11 and having its inner edge flush with the wall of port 12; a flat rubber washer or annulus 19 seated against the base of socket 13 and having its inner edge flush with the wall of port 12; a cup-shaped annular peripherally threaded container 20 of less length than and threadedly engaging with the wall of socket 13, having its edge at its open end clamping against the marginal portion of the rear face of washer 19 and its bottom formed with an air intake opening 21; a check which is shown, by way of example, as consisting of a plunger 22 constituting an air feed cut-off arranged in container 20 and extended through washer 19, port 12 and into washer 18; and a clamping screw 22ª threadedly engaging with the internal threads of collar 14 having fixed to its outer end a hand wheel 23 and with its inner end 24 pointed.

The plunger 22 is formed of a flat reduced outer portion 25, an intermediate portion 26 of polygonal cross section and an inner portion 27 of segmental contour in cross section. The width of portion 25 corresponds to the diameter of portion 26. The diameter of the portion 27 is materially greater than that of portion 27. The portion 27 constitutes the head of the plunger and functions as a cut-off. The washers 18 and 19 coact with the port 12 to form an air feed channel leading from the open end of container 20 to and opening into socket 13. The head of plunger 22 is arranged in container 20 and coacts with washer 19 for closing the intake end of the feed channel. The portion 26 of plunger 22 is of less diameter than the said air feed channel. The portion 27 of plunger 22 is of greater diameter than that of the said air feed channel. When the connection is active, due to the interengagement of elements 6, 7, the portions 25 of plunger 22 is arranged in washer 19 and port 12, the portion 26 of plunger 22 is arranged in port 12 and extends through washer 19 into container 20 and the port 27 of plunger 22 is positioned in container 20 in spaced relation with respect to washer 19. When section 7 is removed from section 6 the portion 25 of plunger 22 extends into socket 9 and the head 27 is maintained against washer 19 by the feed of air whereby the intake end of the air feed channel is closed.

The element 7 consists of a casting 28 of block-like form of rectangular contour, an angle-shaped air supply channel 29 formed of a short branch 30 disposed transversely and a long branch 31 disposed horizontally of the casting 28. The inner ends of the said branches merge into each other. The outer end of branch 30 opens at one side face of the casting. The diameter of branch 30 is materially less than the inner diameter of washer 19. The outer end of branch 31 opens at the outer end of the casting 28. That side of the latter at which the outer end of branch 30 opens is formed with a protuberance 33 of less width and breadth than that of cavity 11 and is adapted to bind against washer 18 when the elements are clamped together to prevent leakage. The branch 30 extends through protuberance 33 axially of the latter. The protuberance 33 is disposed between the transverse median and inner end of the casting. The branch 31 is formed of a part 34 of uniform diameter and a part 35 of gradually increasing diameter. The part 35 forms the outer portion of branch 31. The junction of the parts 34, 35 form branch 31 with a shoulder 36. The part 35 gradually increases in diameter from part 33 to the outer end of channel 29 and is threaded. Threadedly engaging with the part 35 of largest diameter of the branch 31 and abutting shoulder 36 is the tapered peripherally threaded inner portion 37 of a tubular coupling member 38 to which is attached a filling hose 39. That side of casting 28 opposite that side thereof formed with the protuberance 33 is provided with a flared socket 40 for the reception of the pointed inner end of screw 22.

The element 6 is adapted to be connected at that end thereof provided with the socket 13 by any suitable means, not shown, which leads from an air supply source, not shown. When elements 6, 7 are arranged in connected position with respect to the air source and the hose 39, the element 7 is extended into socket 9, the protuberance 33 is positioned in cavity 11, the leg 34 communicates with the outlet end of the air feed channel provided by port 12 and washers 18, 19, the plunger is depressed by protuberance 33 which unseats the portion or head 27, and the screw 22a is adjusted in a direction to have its inner end bind against the wall of socket 40 whereby section 7 is detachably clamped to section 6. When portion or head 27 of plunger 22 is unseated, communication is had between the air source and hose 39. By shifting screw 22a from socket 40 element 7 may be quickly removed from section 6.

The form shown in Figure 5 is the same as that described aforesaid, with the exception that in lieu of the plunger 41 being formed with a circular inner portion of segmental cross section it has its inner portion 42 of globular contour; otherwise than that as stated the modification will be similar in construction to that of the other form.

The castings 8 and 28 are formed of metallic material that is not apt to be impaired or scarred in any manner due to rough handling when the elements 6, 7 are employed to make changes or to damage any of the parts carried by casting 8 or to impair element 7 when it strikes or is dragged over a pavement or floor.

What I claim is:

1. In a separable coupling for air feed and supply lines a female member for connection to the air feed line and a male member for connection to the air supply line, said female member including a casting formed with spaced forward and rear sockets disposed at right angles to each other, said forward socket opening at the front of the casting for receiving the male member and said rear socket opening at one end of the casting for receiving the supply line, said casting being formed axially and intermediate its ends with an airport opening into the rear socket and a cavity opening into the airport and into the rear portion of the forward socket, a pair of annulii, one mounted against the walls of and of less thickness than the depth of said cavity and the other positioned at the base of the rear socket and constituting a valve seat, said annulii having their edges flush with the ends of the wall of said port, a cup shaped container opening at its forward end and ported at its rear end, said container secured within said rear socket and having its forward end abutting said valve seat, a check normally abutting said seat to close the port and including a stem extending through the annulii and airport into said forward socket, said check extending into said container, said male member being in the form of a block for insertion into said forward socket, said block being formed with a protuberance for entering said cavity to open the check, said block being formed with an angle shaped air supply channel opening through the protuberance into said cavity and adapted to communicate with the air supply line, and adjustable means carried by the other end of the casting of the female member for detachably clamping the block in said forward socket.

2. The invention as set forth in claim 1 having said forward socket of square cross section, said rear socket of circular cross section, said block of square cross section, and said angle shaped air supply passage being formed of two branches, one of greater diameter than the other; the branch of smallest diameter opening through said protuberance and the branch of largest diameter adapted to have extended therein the air supply line.

3. The invention as set forth in claim 1 having the block of the male member of square cross section, the forward socket of the female member of square cross section and of materially greater width and breadth than that of the block, and said block having one of its faces formed with a flared socket for receiving the inner end of said adjustable clamping means.

4. In a separable coupling of that type including a female member and a male member for detachable interengagement, said female member including a casting formed with spaced forward and rear sockets disposed at right angles to each other, said forward socket opening at the front of the casting for receiving the male member of the coupling and said rear socket opening at one end of the casting for receiving an air feed line, said casting including a cavity opening into the forward socket and an airport leading from the base of said rear socket to said cavity, said port opening into the cavity and rear socket, a pair of resilient annulii, one mounted in and engaging the walls of and of less thickness than the depth of the cavity, the other positioned within the rear socket at the base of the latter, a cup shaped member engaging with the walls of the rear socket for securing that annulus which is positioned at the base of the rear socket stationary, the inner edges of said annulii registering with the walls of said airport, a check including a head arranged in said cup-shaped member and a stem passing through said annulii into said forward socket, said casting having its other end formed with a threaded opening, and adjustable means connected to the wall of the threaded opening and extending into the forward socket for detachably clamping the male member interengaged with the female member.

WILLIAM G. COLLINS.